(12) United States Patent
Proctor et al.

(10) Patent No.: US 6,346,922 B1
(45) Date of Patent: Feb. 12, 2002

(54) HYBRID ANTENNA ARRANGEMENT FOR USE WITH ELECTRONIC IDENTIFICATION SYSTEMS

(75) Inventors: David Edwin Proctor, Honeydew; Christopher Gordon Gervase Turner, Halfway House; Andries Petrus Cronje Fourie, Johannesburg, all of (ZA)

(73) Assignee: Supersensor (Proprietary) Limited, Goodwood (ZA)

( * ) Notice: Subject to any disclaimer, the term of this patent is extended or adjusted under 35 U.S.C. 154(b) by 0 days.

(21) Appl. No.: 09/495,456

(22) Filed: Feb. 1, 2000

(30) Foreign Application Priority Data

Feb. 1, 1999 (ZA) ................................. 98/8377

(51) Int. Cl.[7] ................................................ H01Q 1/38
(52) U.S. Cl. ........................................ 343/795; 343/802
(58) Field of Search ................................ 343/802, 803, 343/804, 795; H01Q 1/38

(56) References Cited

U.S. PATENT DOCUMENTS

| | | | | |
|---|---|---|---|---|
| 2,978,703 A | * | 4/1961 | Kuecken | 343/803 |
| 3,576,567 A | * | 4/1971 | Shively | 343/730 |
| 5,182,570 A | * | 1/1993 | Nysen et al. | 343/795 |
| 5,189,246 A | | 2/1993 | Marsh et al. | 102/217 |
| 5,198,826 A | * | 3/1993 | Ito | 343/713 |
| 5,282,421 A | | 2/1994 | Marsh et al. | 102/217 |
| 5,353,009 A | | 10/1994 | Marsh et al. | 340/505 |
| 5,406,890 A | | 4/1995 | Marsh et al. | 102/217 |
| 5,519,381 A | | 5/1996 | Marsh et al. | 340/572 |
| 5,537,105 A | | 7/1996 | Marsh et al. | 340/825.54 |
| 5,557,280 A | | 9/1996 | Marsh et al. | 342/44 |
| 5,566,441 A | | 10/1996 | Marsh et al. | 29/600 |
| 5,657,029 A | * | 8/1997 | Iijima et al. | 343/713 |
| 5,699,066 A | | 12/1997 | Marsh et al. | 342/44 |
| 5,726,630 A | | 3/1998 | Marsh et al. | 340/572 |

* cited by examiner

Primary Examiner—Michael C. Wimer
(74) Attorney, Agent, or Firm—Finnegan, Henderson, Farabow, Garrett & Dunner, L.L.P.

(57) ABSTRACT

A dipole antenna 34 comprises a loop 36 as a first pole and an appendage 42 comprising a strip 44 terminating in a pad 46 as a second pole. The circumference of the loop is in the order of one half-wavelength of an operating frequency and an effective length of the appendage is at least 0.15 times the wavelength. The dipole antenna 34 is shorter than conventional half-wavelength dipole antennas, has a better frequency response and the antenna impedance $Z_A$ is dependent on the position of a feedpoint 38 in the loop 36. The antenna may be used with transponders for electronic radio frequency identification systems.

13 Claims, 6 Drawing Sheets

HYBRID ANTENNA ARRANGEMENT FOR USE WITH ELECTRONIC IDENTIFICATION SYSTEMS

BACKGROUND OF THE INVENTION

This invention relates to an antenna and more particularly to an antenna for use with a transponder forming part of an electronic radio frequency identification system comprising an interrogator or reader and a plurality of transponders.

Known electronic identification systems of the aforementioned kind comprise an interrogator comprising a transmitter for transmitting an interrogation signal to the transponders and a receiver for receiving a response signal from the transponders. A microprocessor in the interrogator identifies a particular transponder from data in the response signal received from that transponder. Each transponder comprises an antenna and a detector circuit for receiving and collecting power from the interrogation signal, to present a high enough voltage to power a modulator and logic circuitry of the transponder.

The antennas that are being used in the known transponders are divided into two main groups, namely conventional linear half-wavelength resonant dipole antennas and loop antennas. The main disadvantage of the half-wave dipole antenna is that it is too long for many applications. The main disadvantage of the loop antenna is that its radiation and response pattern is too dependent on the proximity of other objects. In a case where a plurality of transponders are randomly orientated, this dependence may result in some of the transponders not receiving the interrogation signal from the interrogator.

SUMMARY OF THE INVENTION

Accordingly it is an object of the present invention to provide an antenna with which the applicant believes the aforementioned disadvantages may at least be alleviated.

According to the invention there is provided a dipole antenna wherein a first pole comprises an electrically conductive loop and a second pole comprises an electrically conductive appendage extending outwardly from the loop.

The loop may have any suitable shape or configuration such as a circular shape, oval shape, square shape, rectangular shape etc and the circumference of the loop is preferably substantially equal to one half wavelength of an operational frequency.

The loop is preferably rectangular in shape.

The appendage has a length which is preferably at least 0.15 times the aforementioned wavelength and may comprise a linear strip having a length of at least 0.15 times the aforementioned wavelength.

In other embodiments the strip may be shorter and be a link terminating in a solid electrically conductive flat body or pad.

In a preferred embodiment an outer profile of the loop and an outer profile of the pad are the same.

The antenna may be symmetrical about a center axis extending through the loop, the appendage and the pad. The antenna may also be symmetrical about an axis extending perpendicularly to the centre axis.

A feedpoint for the antenna may be provided at an interruption in the loop.

The antenna may have an antenna impedance at the feedpoint which is dependent on a position selected on the loop for the feedpoint.

The loop may comprise impedance matching means.

Also included within the scope of the present invention is a transponder of a radio frequency electronic identification system which transponder comprises an antenna as hereinbefore defined. An electronic identification system comprising such transponders is also included within the scope of the present invention.

BRIEF DESCRIPTION OF THE ACCOMPANYING DRAWINGS

The invention will now further be described, by way of example only, with reference to the accompanying diagrams wherein.

Figure 6:
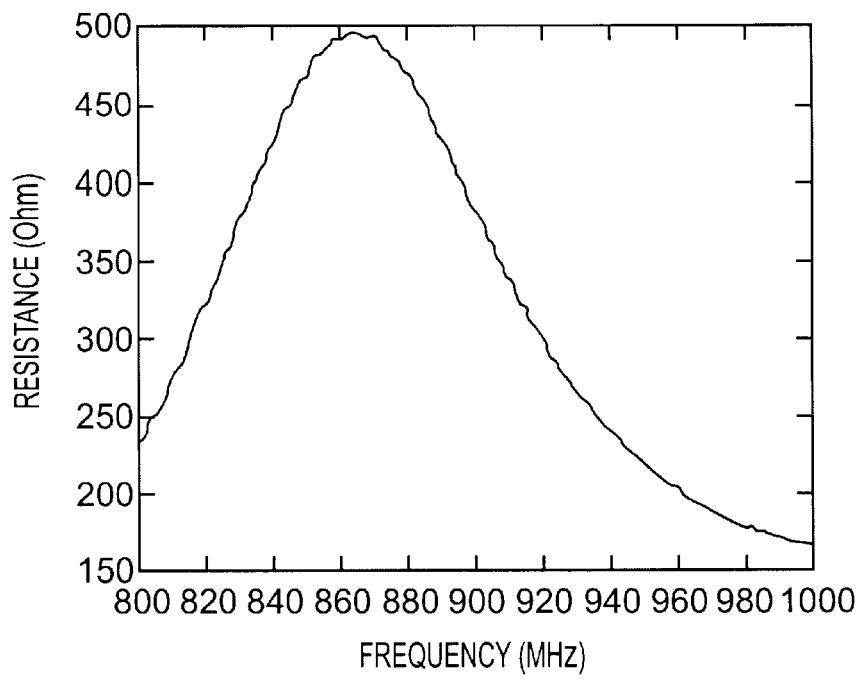
Figure 7:
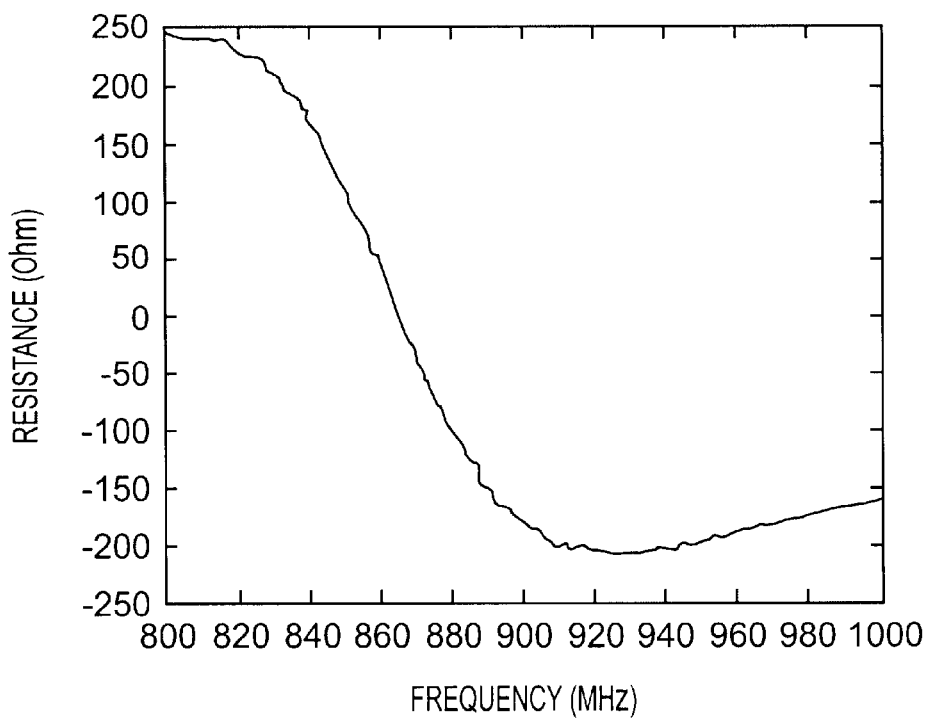

FIG. 6 is a graph against frequency of the resistive component of the antenna impedance in parallel with a load comprising 750 ohm in parallel with 1.6 pf; and FIG. 7 is a graph against frequency of the reactive component of the antenna impedance in parallel with a load comprising 750 ohm with 1.6 pF.

DESCRIPTION OF PREFERRED EMBODIMENTS OF THE INVENTION

Figure 1:
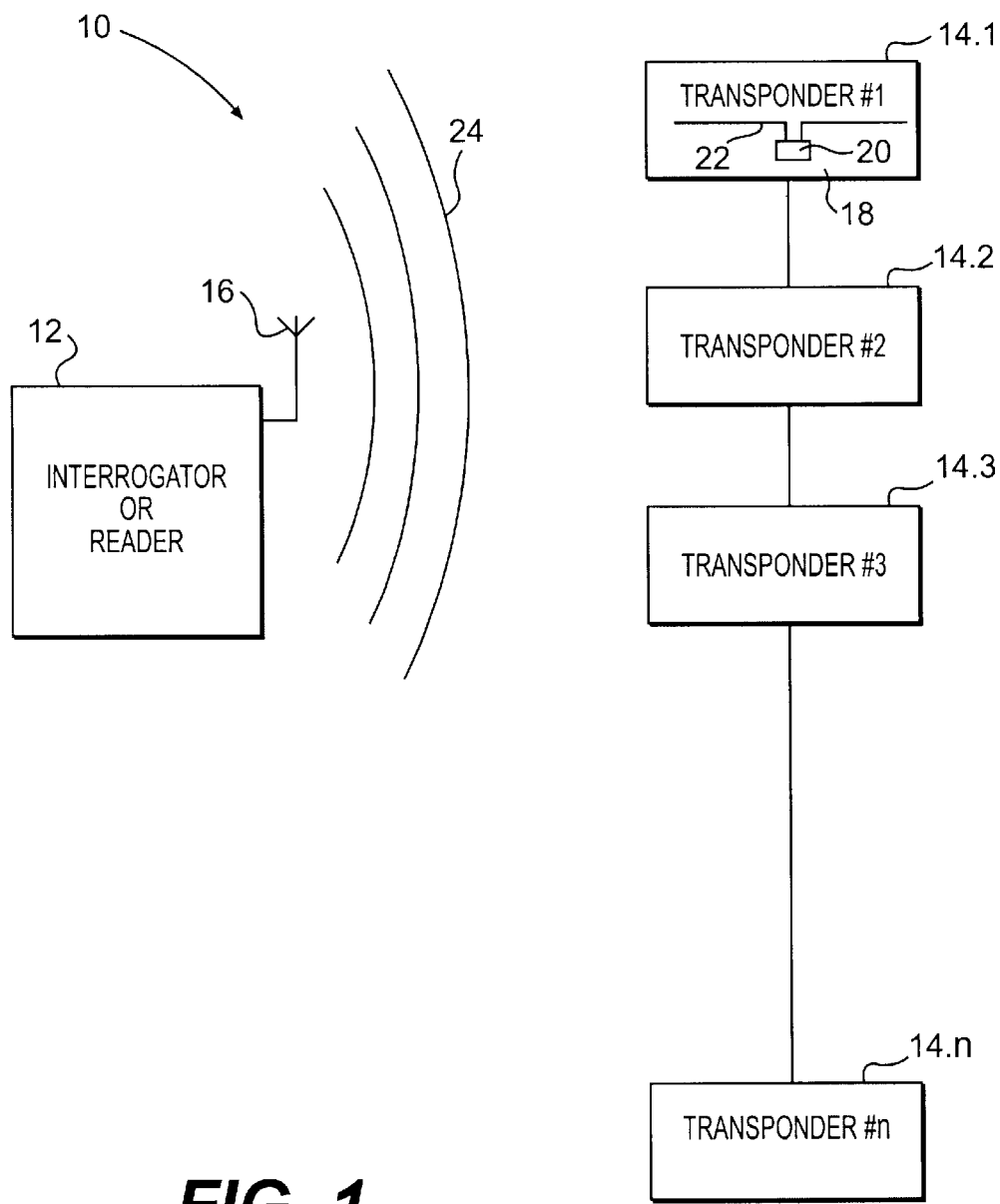
FIG. 1 is a block diagram of a known electronic radio frequency identification system.

A known electronic radio frequency (RF) identification system 10 is shown in FIG. 1.

The system includes an interrogator or reader 12 and a plurality of passive RF transponders 14.1 to 14.n. In use, the transponders are mounted on articles to be identified. The interrogator 12 comprises an antenna 16 and each transponder, such as transponder 14.1, comprises a substrate 18 on which is mounted a chip 20 including integrated circuits of the transponder. The chip 20 is connected to an antenna 22 also mounted on the substrate.

The articles are identified by causing an RF energizing signal 24 to be transmitted by the interrogator. Each transponder receives the energizing signal via its antenna 22, utilizes energy in the signal to power the local integrated circuits on the chip 20 and then responds to the energizing signal by transmitting or backscattering to the interrogator a response signal including an identification code characteristic of the transponder. The interrogator receives the response signal and reads the identification code. The code is utilized by the interrogator to identify the transponder and an article on which it is mounted. Although passive transponders utilising backscatter technology are described hereabove, this invention may be used with other passive transponders too, as well as active transponders.

The disadvantages of conventional linear half-wavelength dipole antennas 22 are described in the introduction of this specification.

Figure 2:
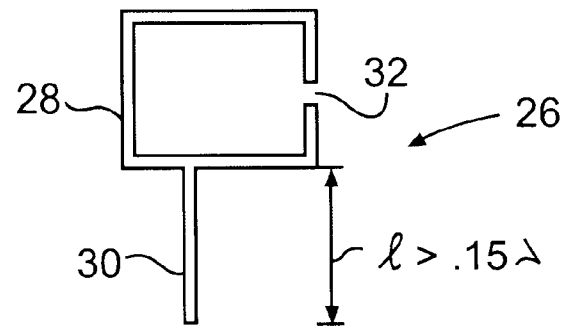
FIG. 2 is a plan view of a first preferred embodiment of a hybrid antenna according to the invention.

Referring to FIG. 2, antenna 26 according to the invention is a dipole antenna, a first pole of which comprises a loop 28 and a second pole of which comprises an appendage 30 extending outwardly away from the loop. The loop is rectangular in configuration and provides a feed point 32 at an interruption therein. The circumference of the loop is in the order of one half wavelength ($\lambda/2$) of an operating frequency such as 900 MHz. The appendage has a length I of at least 0.15 times the aforementioned wavelength.

Figure 3A:
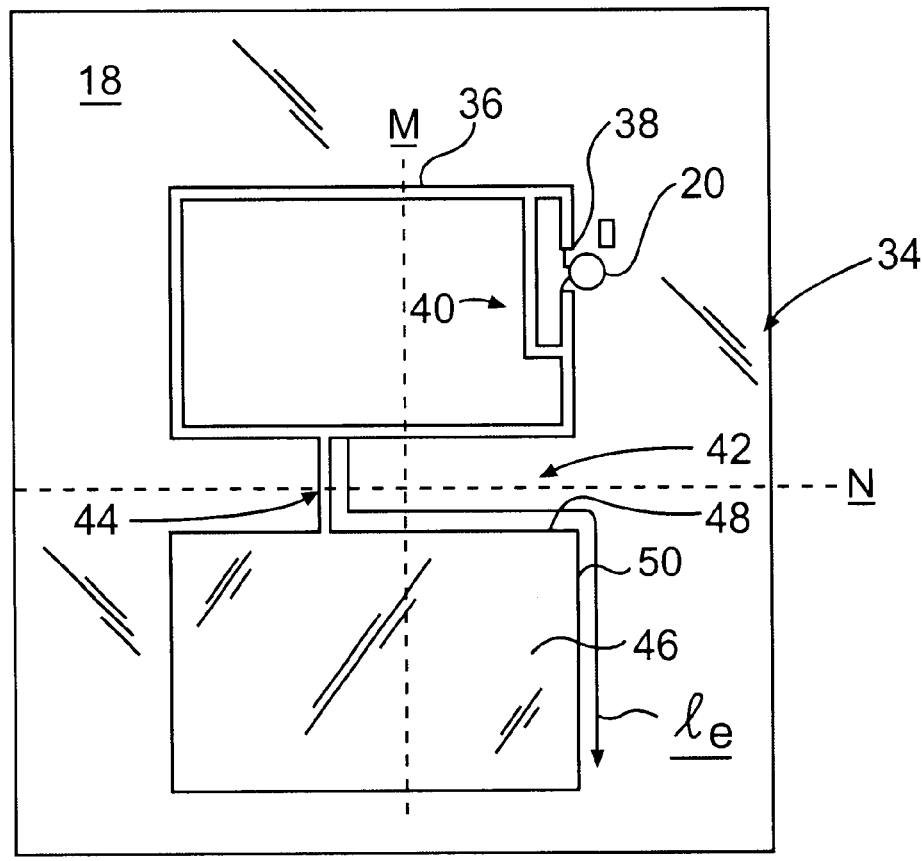
FIG. 3A is a similar view of a second embodiment.
Figure 3B:
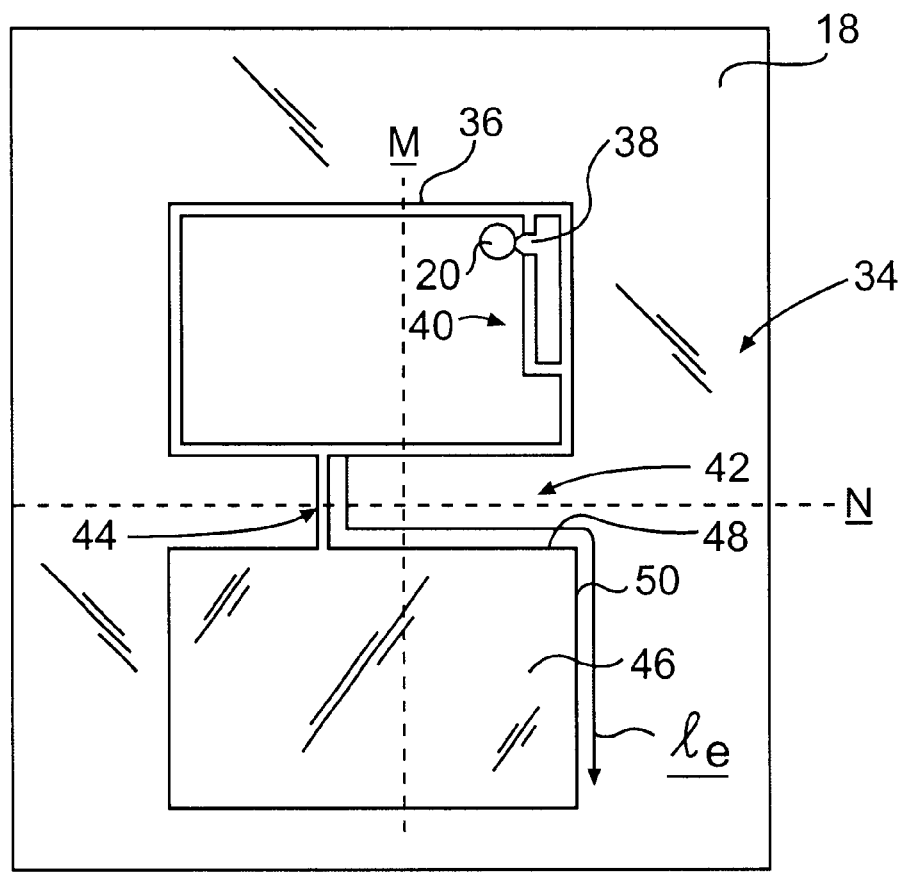
FIG. 3B is a similar view of a variation of the embodiment in FIG. 3A.

The second embodiment of the antenna designated 34 in FIG. 3A comprises a loop 36 having a rectangular outer profile. Feedpoint 38 is provided at an interruption in the loop. A chip 20 of a transponder is connected to the antenna at feedpoint 38. The loop also includes a parallel impedance matching arrangement 40 to match the impedance $Z_A$ of the antenna 34 to an input impedance of the circuitry on the chip. In another embodiments, as shown in FIG. 3B, the matching arrangement may be connected in series with the input impedance of the chip 20. In such a case, the chip 20 and feedpoint 38 could be provided where the matching network 40 meets the top leg of the loop 36.

The appendage 42 of the antenna comprises a link 44 extending outwardly away from the loop 36 and terminating in a solid flat body or pad 46. The effect of the pad is amongst others to shorten the overall length of the antenna, since an effective length $I_e$ of at least $0.15\lambda$ for the appendage is provided collectively by the link 44 and sides 48 and 50 of the pad. The overall length of the antenna 34 is 81 mm compared to 150 mm for a half-wavelength dipole. Although such symmetry is not illustrated in FIG. 3, the antenna may be symmetrical about a centre vertical axis M (shown in FIG. 3) extending through the loop, the link and the pad. It may also be symmetrical about an axis N perpendicular to the centre axis.

Figure 4:
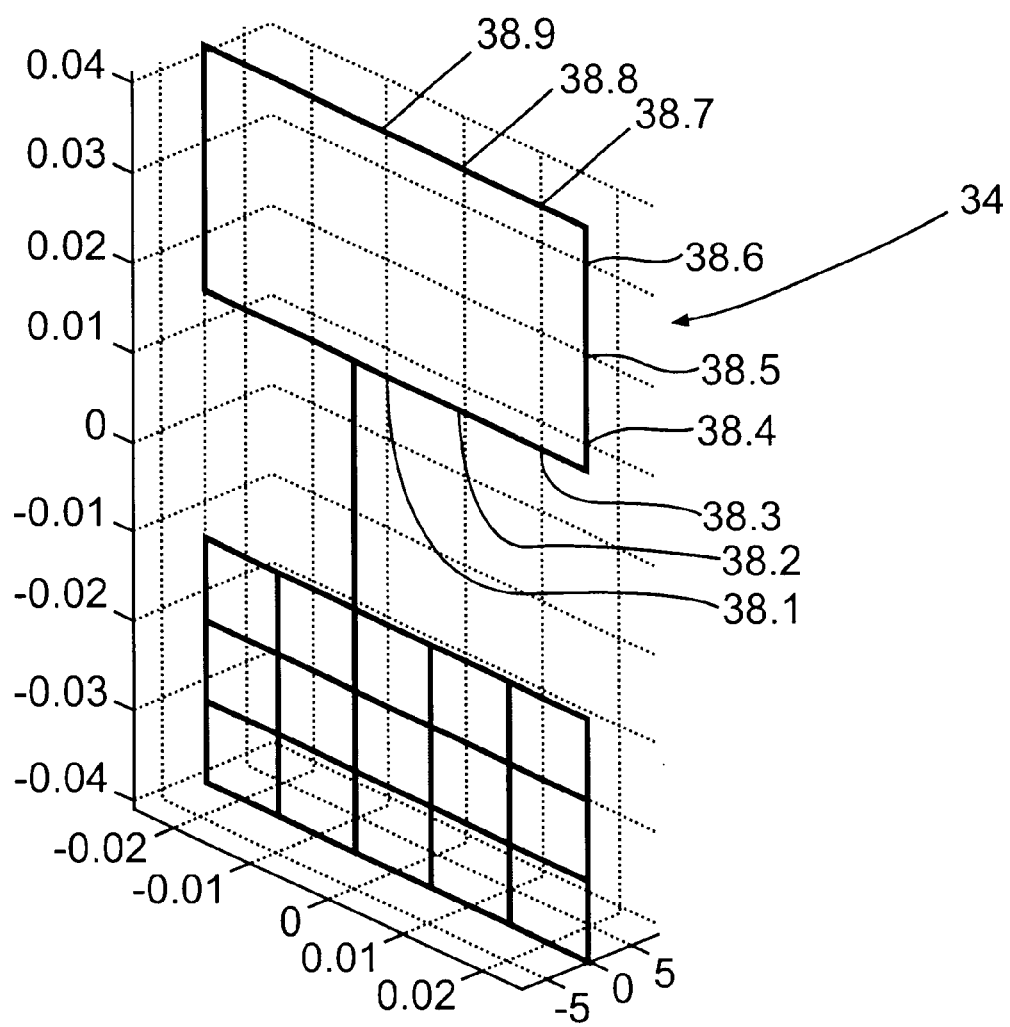
FIG. 4 is a three dimensional view of the antenna in FIG. 3.
Figure 5:
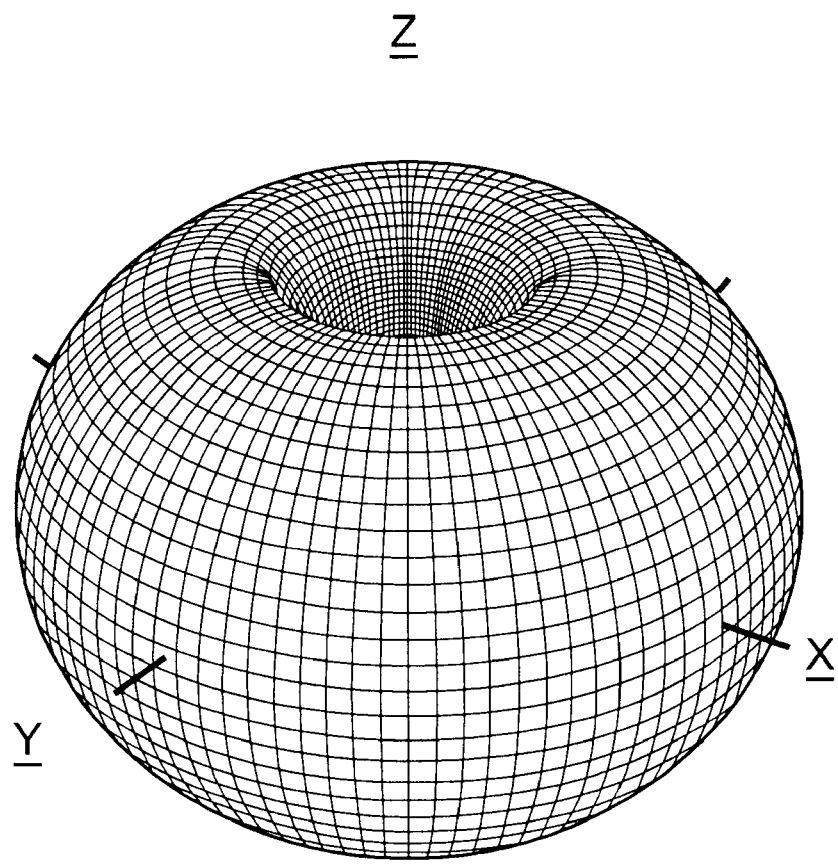
FIG. 5 is a diagram of the radiation pattern of the antenna in FIG. 4.

A three dimensional representation of the antenna 34 is shown in FIG. 4 along X, Y and Z axes. In FIG. 5 a radiation pattern of the antenna, is shown which is similar to that of a conventional half-wavelength dipole.

Referring to FIG. 4, it has been found by the applicant that the antenna impedance $Z_A$ (shown in FIG. 3) is dependent on the position of the feedpoint 38 on the loop. For the positions 38.1 to 38.9 in FIG. 4, the following impedances were obtained:

| POSITION | IMPEDANCE (ohm) |
|---|---|
| 38.1 | 88 |
| 38.2 | 96 |
| 38.3 | 129 |
| 38.4 | 185 |
| 38.5 | 268 |
| 38.6 | 548 |
| 38.7 | 1150 at 900 MHz |
| 38.8 | 1600 at 900 MHz |
| 38.9 | 2000 at 900 MHz |

Up to position 38.6 a resonance at about 870 MHz was obtained. For positions 38.7 to 38.9 large impedances with an inductive component were obtained in the frequency range 850–950 MHz.

Hence, by selecting a suitable position for feedpoint 38, a large antenna impedance (for example 548 ohm) may be selected and obtained, to be matched relatively easily with a high input impedance of the chip 20. Hence the antenna may be matched with chips having input impedances of larger than 400 ohm, for example.

In FIGS. 6 and 7 there are shown graphs against frequency of the resistive and reactive components respectively of the antenna impedance $Z_A$ over the frequency range 800 MHz to 1 GHz. It will be seen that the changes are relatively small and certainly smaller than for a comparable conventional half-wavelength dipole. Hence, it will be appreciated that the operational bandwidth of the hybrid antenna according to the invention is expected to be better than that of a conventional half-wavelength dipole.

It will further be appreciated that there are many variations in detail on the antenna, transponder, and electronic identification system according to the invention without departing from the scope and spirit of this disclosure.

What is claimed is:

1. A dipole antenna comprising:
   a first pole comprising an electrically conductive loop having no more than one interruption and providing a high impedance feed mechanism for the antenna at a feedpoint on the loop; and
   a second pole comprising an electrically conductive appendage galvanically connected to the loop in a connection region on the loop and extending outwardly from the loop, the loop and the appendage forming part of a layer on a substrate;
   the feedpoint being circumferentially spaced on the loop from the connection region;
   thereby to provide an off-center fed dipole antenna with the feed point at a higher impedance than the connection region.

2. An antenna as claimed in claim 1 wherein the circumference of the loop is substantially equal to one half wavelength of an operational frequency.

3. An antenna as claimed in claim 1 wherein the loop is rectangular in shape.

4. An antenna as claimed in claim 1 wherein the appendage comprises a link terminating in an electrically conductive pad.

5. An antenna as claimed in claim 4 wherein an outer profile of the loop and an outer profile of the pad are the same.

6. An antenna as claimed in claim 3, wherein the feedpoint is provided in a corner region of the rectangular loop.

7. A transponder of a radio frequency electronic identification system comprising a chip which is connected to a dipole antenna as claimed in claim 1.

8. A radio frequency electronic identification system comprising an interrogator and at least one transponder as claimed in claim 7.

9. An antenna as claimed in claim 1 wherein the loop has one interruption that provides the feedpoint.

10. An antenna as claimed in claim 1, wherein there is no interruption in the loop and the feedpoint is provided in a bypass section of a part of the loop.

11. A transponder of an electronic identification system comprising:
   a chip having an input impedance; and
   a dipole antenna comprising:
      a first pole comprising an electrically conductive loop having no more than one interruption and providing a high impedance feed mechanism with an antenna impedance for the antenna at a feed point on the loop; and
      a second pole comprising an electrically conductive appendage galvanically connected to the loop in a connection region on the loop and extending outwardly from the loop;
      the feedpoint being circumferentially spaced on the loop from the connected region;
      thereby to provide an off-center fed dipole antenna with the feed point at a higher impedance than the connection region;
   the chip being connected to the antenna at the feedpoint and the input impedance of the chip and the antenna impedance being at least $400\Omega$.

12. A transponder as claimed in claim 11 wherein the antenna comprises impedance matching means in parallel with the input impedance of the chip.

13. A transponder as claimed in claim 11 wherein the antenna comprises impedance matching means in series with the input impedance of the chip.

* * * * *